US012048947B2

(12) United States Patent
Barlag et al.

(10) Patent No.: US 12,048,947 B2
(45) Date of Patent: Jul. 30, 2024

(54) PAINTING METHOD WITH PRINTED MASK AND PRINTING DEVICE

(71) Applicant: Airbus Operations GmbH, Hamburg (DE)

(72) Inventors: Carsten Barlag, Hamburg (DE); Daniel Lahidjanian, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/692,525

(22) Filed: Mar. 11, 2022

(65) Prior Publication Data

US 2022/0288630 A1 Sep. 15, 2022

(30) Foreign Application Priority Data

Mar. 15, 2021 (DE) ........................ 102021106232.2

(51) Int. Cl.
*B05D 1/32* (2006.01)
*B05B 3/00* (2006.01)

(52) U.S. Cl.
CPC ................ *B05D 1/322* (2013.01); *B05B 3/00* (2013.01)

(58) Field of Classification Search
CPC ...................................................... B05D 1/322
See application file for complete search history.

(56) References Cited

U.S. PATENT DOCUMENTS

| | | | | |
|---|---|---|---|---|
| 2005/0255249 A1 | | 11/2005 | Schlatterbeck et al. | |
| 2006/0068108 A1 | | 3/2006 | Beckord | |
| 2008/0299297 A1 | | 12/2008 | Cousins et al. | |
| 2011/0104394 A1 | * | 5/2011 | Beier | B05D 1/26 427/535 |
| 2012/0015107 A1 | * | 1/2012 | Schacht | B44C 5/0453 427/261 |
| 2012/0189823 A1 | | 7/2012 | Ohtake et al. | |
| 2014/0063096 A1 | | 3/2014 | Pitz et al. | |
| 2014/0349031 A1 | * | 11/2014 | Nakamura | B05D 1/322 427/282 |
| 2018/0099309 A1 | * | 4/2018 | De Fillippi | B05B 16/20 |
| 2020/0140704 A1 | * | 5/2020 | Tomlinson | C09D 9/005 |

(Continued)

FOREIGN PATENT DOCUMENTS

| | | |
|---|---|---|
| DE | 10224128 A1 | 12/2003 |
| DE | 10260215 A1 | 7/2004 |
| DE | 202004011153 U1 | 2/2005 |

(Continued)

OTHER PUBLICATIONS

German Search Report; priority document.
Extended European Search Report from corresponding European application No. EP22158909.6 dated Jul. 18, 2022.

*Primary Examiner* — Nathan H Empie
(74) *Attorney, Agent, or Firm* — Greer, Burns & Crain, Ltd.

(57) ABSTRACT

To improve the complicated painting process of large three-dimensionally shaped components, preferably aircraft components, the masking step is automated. This is achieved by printing a masking medium onto the component with an inkjet method, the masking medium forming a masking film. The masking film masks the desired surface area and can be pulled off following the end of the painting. Preferably, spray films, functional printing inks or mold release agents are used as the masking medium.

8 Claims, 4 Drawing Sheets

(56) References Cited

U.S. PATENT DOCUMENTS

2020/0255956 A1 8/2020 Desai et al.

FOREIGN PATENT DOCUMENTS

| | | | | |
|---|---|---|---|---|
| DE | 102012007372 | A1 | 11/2012 | |
| DE | 102012017538 | A1 | 3/2014 | |
| DE | 102017217847 | A1 | 4/2019 | |
| DE | 102017129555 | A1 | 6/2019 | |
| EP | 2153910 | A1 * | 2/2010 | ......... B05B 13/0457 |
| EP | 2319630 | A1 | 5/2011 | |
| EP | 3693617 | A1 | 8/2020 | |

* cited by examiner

PAINTING METHOD WITH PRINTED MASK AND PRINTING DEVICE

CROSS-REFERENCES TO RELATED APPLICATIONS

This application claims the benefit of the German patent application No. 102021106232.2 filed on Mar. 15, 2021, the entire disclosures of which are incorporated herein by way of reference.

FIELD OF THE INVENTION

The invention relates to a painting method and a printing device for use in such a method.

BACKGROUND OF THE INVENTION

Until now, aircraft components have been masked by hand before painting, not least because of their curved surfaces. The outlay on masking for aircraft is particularly high, for example, in the door and window regions and the surfaces provided with letters or logos.

There is therefore a need to automate the masking operation as far as possible.

SUMMARY OF THE INVENTION

The invention is based on an object of improving painting methods for components, preferably with a view to further automation.

The invention devises a painting method for painting a component, preferably an aircraft component, comprising the steps:

1.1 providing the component;

1.2 applying a film-forming masking medium in some areas by printing the masking medium onto the component by means of a printhead in order to create at least one masked surface area;

1.3 causing a masking film to form or forming a masking film from the masking medium;

1.4 painting the component with a painting medium; and 1.5 removing the masking film from the component to expose the masked surface area.

Preferably, in step 1.1 the component has been or is provided with an undercoat.

Preferably, in step 1.1 a further layer is applied to the component material or to the undercoat.

Preferably, the masking medium printed in step 1.2 is a liquid film-forming masking medium. The masking medium is preferably a spray-film liquid, a printing ink or a liquid mold release agent.

Preferably, in step 1.3 the masking film is formed by causing a solvent to evaporate from the masking medium or by activating the masking medium by means of heating or by means of irradiation, preferably by means of irradiation with (UV) light.

Preferably, in step 1.5 the masking film is removed by mechanical removal, preferably by pulling off mechanically. Preferably, in step 1.5 the masking film is weakened, for example by cutting or lasering. Preferably, in step 1.5 the masking film is removed with the aid of compressed air, preferably blown away. Preferably, in step 1.5 the masking film is removed by means of a suction device, preferably sucked off Preferably, the mechanical removal is carried out by a gripping device. Preferably, the masking film has a starting point for the removal, the starting point being formed by a strip element embedded in the masking film, for example an adhesive strip, in step 1.5 the starting point being gripped mechanically in order to begin the removal. Preferably, in step 1.5 the masking film is removed by means of brushing, scratching, rubbing, a water jet and/or a high pressure cleaner.

Preferably, in step 1.5 a covering lacquer layer is applied in order to reduce the adhesion of the masking film, and then the masking film is detached from the component by mechanical removal.

The invention further devises a printing device for printing components, preferably aircraft components, wherein the printing device has a printhead that can be moved relative to the component and a reservoir connected fluidically to the printhead, which supplies the printhead with material to be printed, the reservoir containing a liquid masking medium. The masking medium is preferably a spray-film liquid, a printing ink or a liquid mold release agent.

The invention additionally devises a use of such a printing device when carrying out a previously described painting method.

One idea of the invention is to apply the masking medium or the masking film to the component by inkjet methods. This can be a fully automated process, so that manual masking of the component before the painting can be dispensed with. Inkjet methods for printing three-dimensional objects are certainly known per se (for example Heidelberger Druckmaschinen Omnifire).

The method proposed here is a novel application for inkjet methods, in that the material applied therewith is used as a masking film for painting subsequently carried out. The masking film thus printed on can be pulled off simply after the painting, as distinct from the conventional method. The printing ink can be, for example, a UV ink which cures into a finished masking film as a result of irradiation with UV light.

Trials by the applicant have shown that conventional printing inks on a paint undercoat that is usual in aviation are functionally suitable as a masking medium. The functional printing ink covers but does not necessarily provide any color and adheres only slightly, and can therefore be pulled off the component manually, by means of a gripper or other methods.

It is also possible to print a spray-film liquid as a masking medium, if this has approximately the same viscosity as functional printing inks. Furthermore, it is also conceivable that a liquid mold release agent, such as is used in the production of composite fiber components in a mold, can be printed as a masking medium. The mold release agent preferably has a similar viscosity to that of the functional printing ink.

Furthermore, the trials by the applicant have shown that the application of a covering lacquer layer (clear lacquer or the like) can assist the detachment of the masking medium.

By using the ideas described herein, a printable masking film, which can allow the manual work on the component to be dispensed with, is made possible. Printing preferably permits accurate and targeted metering on the component, so that fewer waste materials accumulate and the quality of the result can be increased. Furthermore, printing permits full automation of the masking process, so that ultimately the entire painting operation can be automated. Overall, the entire process time for the painting can also be reduced hereby.

BRIEF DESCRIPTION OF THE DRAWINGS

Exemplary embodiments will be explained in more detail by using the appended schematic drawings, in which.

DETAILED DESCRIPTION OF THE PREFERRED EMBODIMENTS

Figure 1:
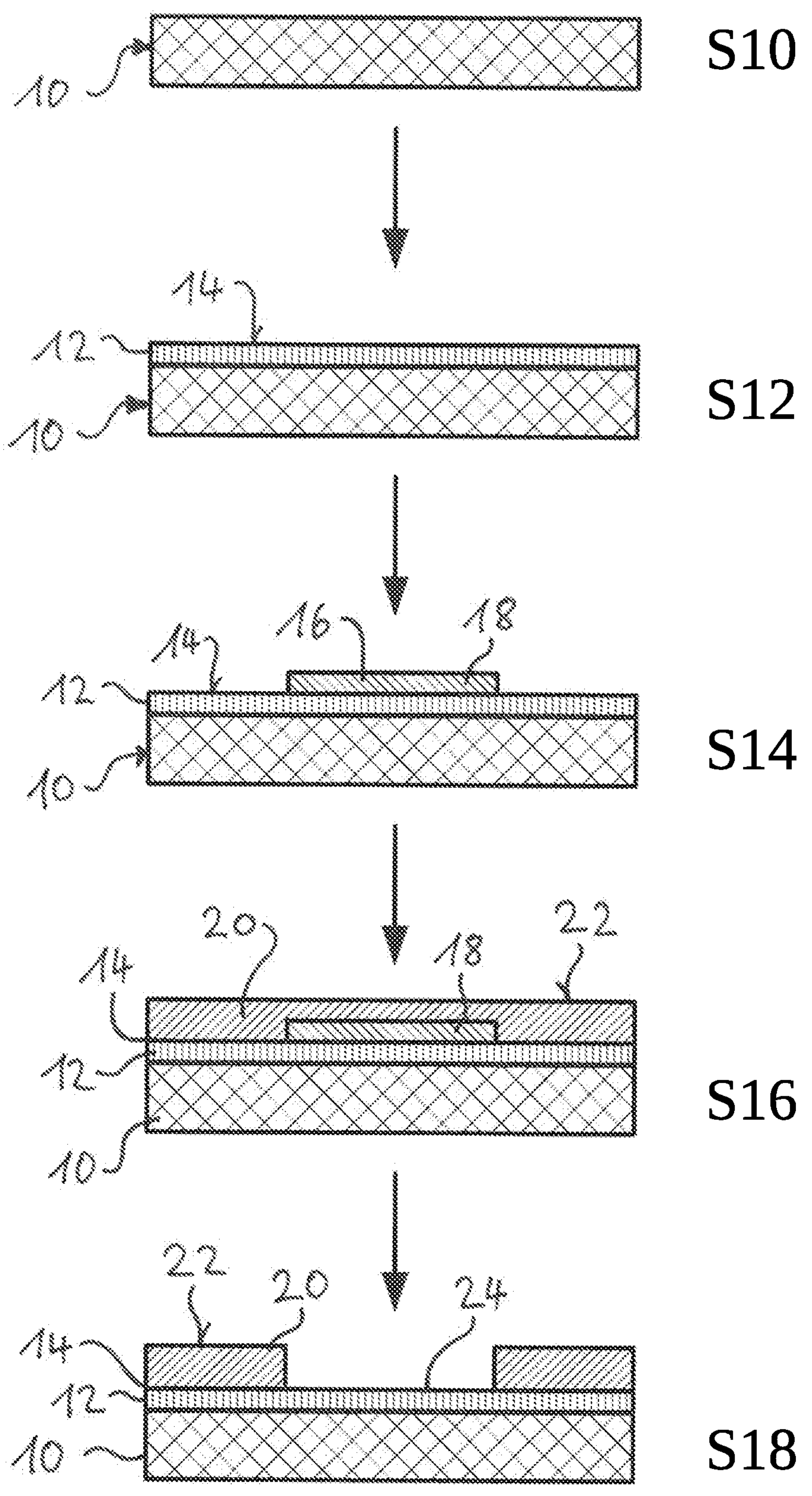
FIG. 1 shows an exemplary embodiment of a painting method.

FIG. 1 shows, schematically, a painting method comprising the steps S10 to S18.

In the first step S10, an aircraft component 10 is provided. The aircraft component 10 can, for example, be a component arranged on the outside of an aircraft. The aircraft component 10 can be painted for the first time or treated to repainting. The aircraft component 10 can undergo a pretreatment (for example cleaning, grinding off and the like).

In a second step S12, a first paint structure can be applied to the aircraft component as an undercoat 12. The paint structure can include various layers, for example an adhesion promoter, a primer or further functional layers (e.g., corrosion and/or erosion protection). To improve the adhesion of further layers, a further layer 14 can additionally be applied to the undercoat 12. The application can be carried out in a usual way by rolling, brushing or spraying.

In the third step S14, a liquid film-forming masking medium 16 is printed on. The printing is carried out by an inkjet printhead. The masking medium 16 can be a spray-film liquid, a functional printing ink or a mold release agent.

The masking medium 16 forms a closed masking film 18 by the solvent evaporating out of the masking medium 16. It is also possible that the masking medium 16 forms the masking film 18 only by activation, for example by UV light or heat. The masking film 18 rests on the surface or adheres only minimally to the surface but does not enter into any composite. The result is therefore good detachability of the masking film 18 from the layer lying underneath.

In the fourth step S16, conventional topcoats can be applied as a painting medium 20 in a manner known per se. These can preferably provide color in order, for example, to produce a desired logo. It is additionally possible for a covering lacquer layer 22 (normally clear lacquer) to be applied onto the painting medium 20. The painting medium 20 and/or the covering lacquer layer 22 can help during the detachment of the masking film 18 in the further method.

In the fifth step S18, the masking film 18 is removed mechanically, for example pulled off, which means that the masked surface area 24 is exposed.

Figure 2:
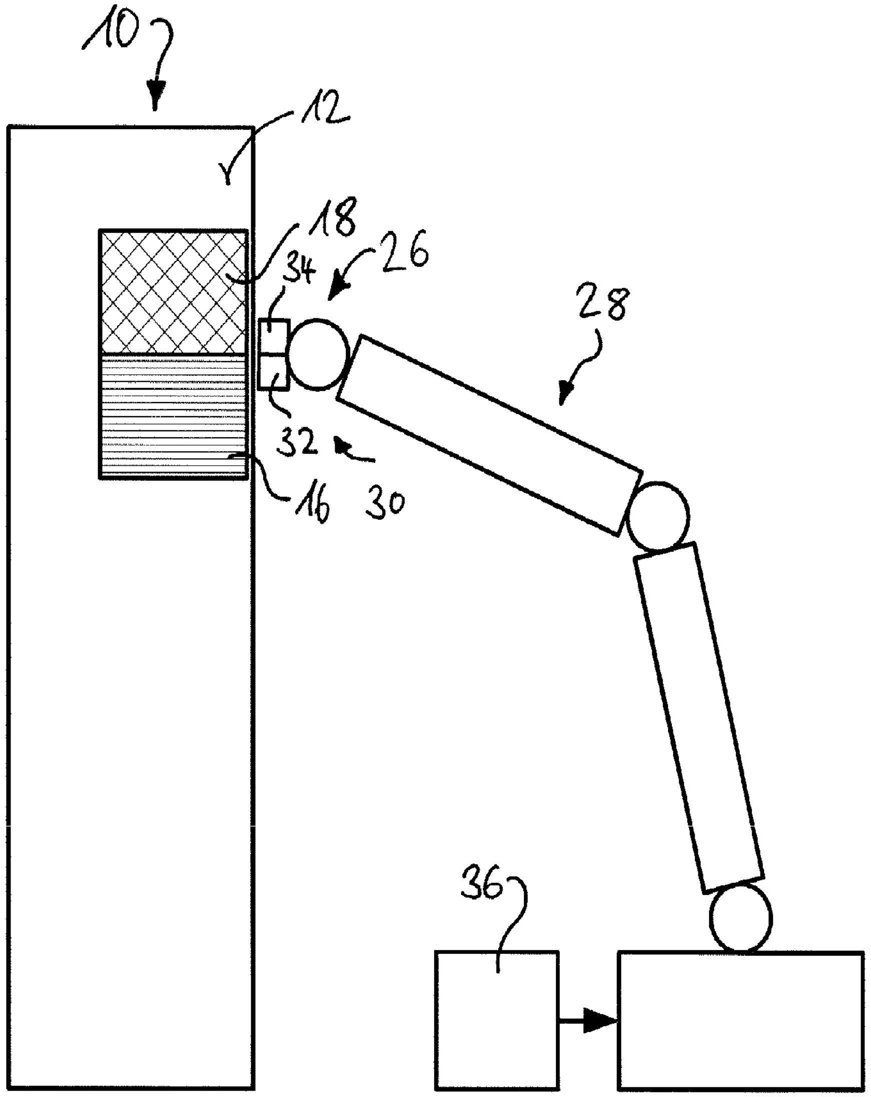
FIG. 2 shows an exemplary embodiment of a printing device.
Figure 3:
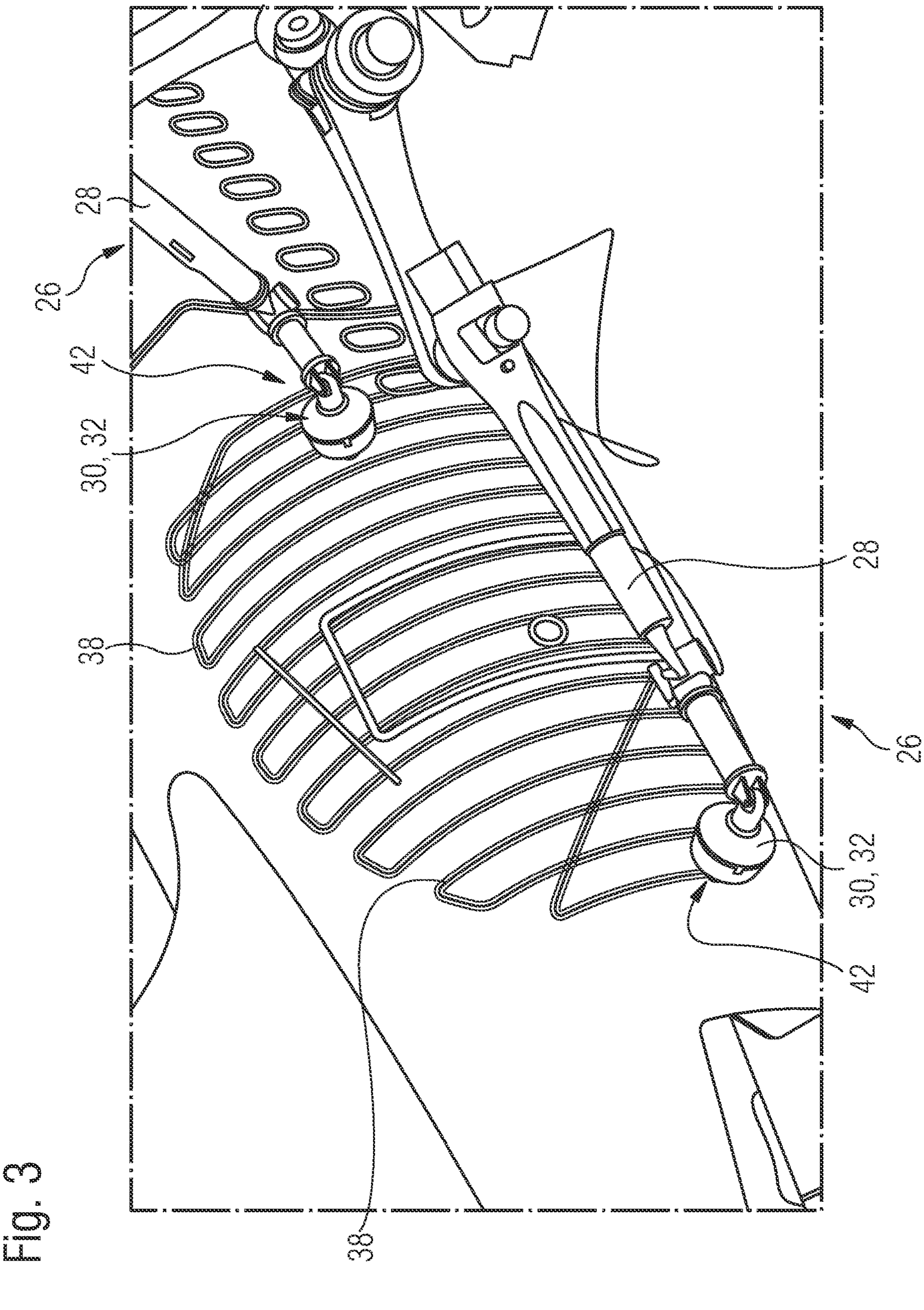
FIG. 3 shows a view of the printing device during masking.

FIG. 2 and FIG. 3 show, schematically, a printing device 26 which can be used for the previously described method. The printing device 26 comprises a robot arm 28, to the end of which a printhead 30 is attached. The printhead 30 is configured as an inkjet printhead 32 and, depending on the type of ink, can have an activating unit 34 for activating or curing the printed functional printing ink. The printing device 26 also has a reservoir 36 which contains the functional printing ink or the masking medium 16.

As can be seen in more detail from FIG. 3, the printhead 30 travels over a predefined masking path 38 on the aircraft component 10 in order to mask the surface area 24, for example in an elliptical shape. As a result of the targeted application, the surface area 24 is masked sharply, which means that a clear contour is produced following the removal.

Furthermore, the printing device 26 can comprise a masking film removal device 40. The masking film removal device 40 can grip the masking film 18 and remove it mechanically from the aircraft component 10. Depending on the type of mechanical removal, the masking film removal device 40 can have a laser, a knife, a compressed air nozzle, a gripper, a suction cup, a suction pipe, a device for a water jet or high-pressure water jet, a brush and/or a scratching or rubbing device.

Figure 4:
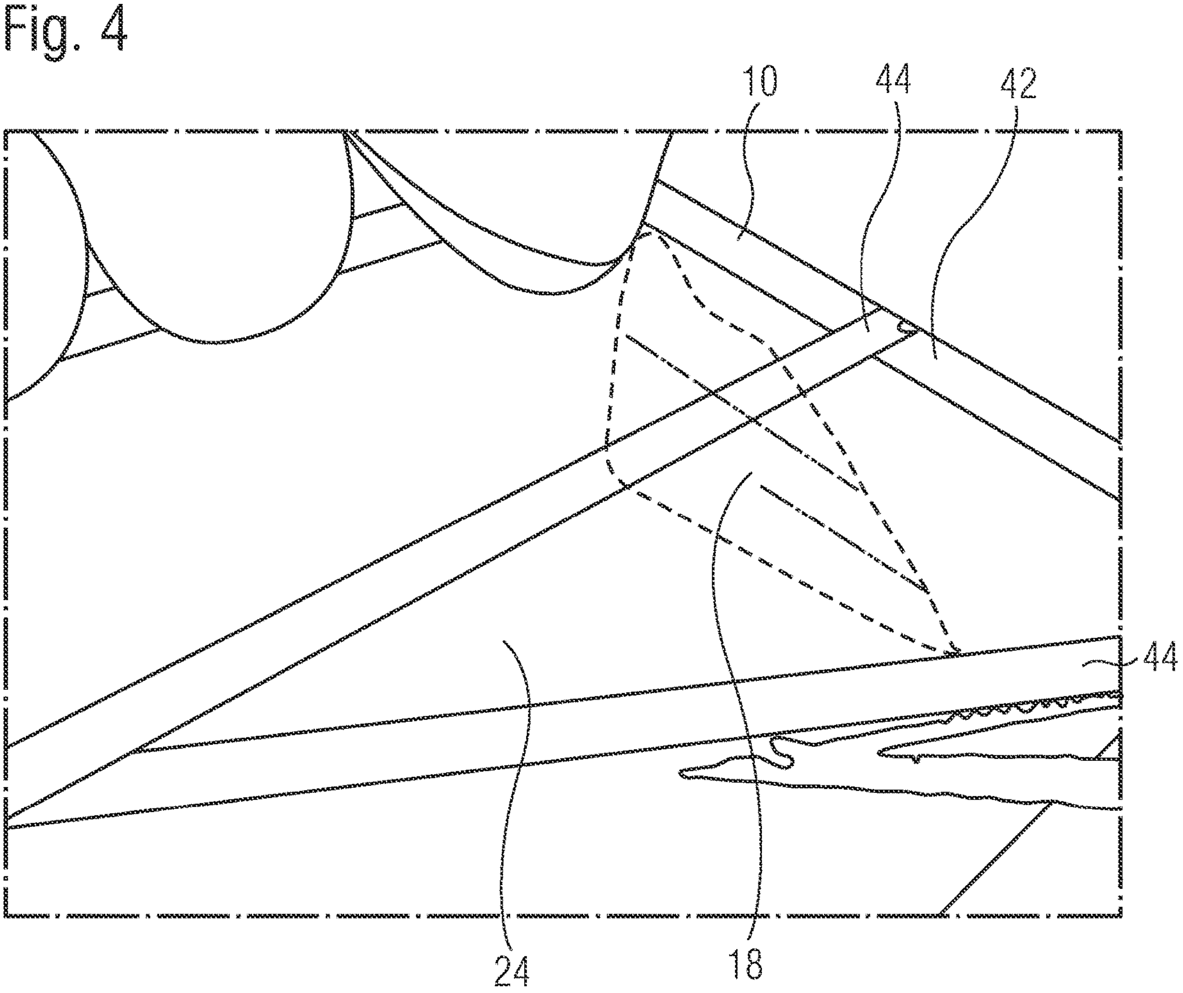
FIG. 4 shows a view of the removal of the masking film from a trial by the applicant.

FIG. 4 is a photograph of a pulling-off trial by the applicant. The masking film 18 was applied to a white base paint layer 42 and then covered with a clear lacquer. The masking film 18 was then successfully pulled off the base paint layer 42 manually between two predefined dividing lines 44.

In order to improve the complicated painting process of large three-dimensionally shaped components, preferably aircraft components, it is proposed to automate the masking step. This can be achieved by a masking medium being printed onto the component in the inkjet method, which forms a masking film. The masking film masks the desired surface area and can be removed following the end of the painting. Preferably, spray films, functional printing inks or mold release agents are used as the masking medium.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SYMBOLS

10 Aircraft component
12 Undercoat
14 Further layer
16 Masking medium
18 Masking film
20 Painting medium
22 Covering lacquer layer
24 Surface area
26 Printing device
28 Robot arm
30 Printhead
32 Inkjet printhead
34 Activating unit
36 Reservoir
38 Masking path
40 Masking film removal device
42 Base paint layer
44 Dividing line

The invention claimed is:

1. A painting method for painting a component, comprising, in order, the steps:

1.1 providing the component;

1.2 applying a film-forming masking medium in some areas by printing the masking medium onto the component by means of a printhead in order to create at least one masked surface area;

1.3 causing a masking film to form or forming a masking film from the masking medium;

1.4 painting the component with a painting medium;

1.4a applying a covering lacquer layer on top of the painting medium in order to reduce an adhesion of the masking film; and 1.5 removing the masking film, a portion of the painting medium, and a portion of the covering lacquer layer from the component to expose the at least one masked surface area, wherein the covering lacquer layer remains after the masking film is removed from the component.

2. The method according to claim 1, wherein in step 1.1 the component has been or is provided with an undercoat.

3. The method according to claim 2, wherein in step 1.1 a further layer is applied to a material of the component or to the undercoat.

4. The method according to claim 1, wherein the masking medium printed in step 1.2 is a liquid film-forming masking medium.

5. The method according to claim 4, wherein the liquid film-forming masking medium comprises at least one of a printing ink or a release agent.

6. The method according to claim 1, wherein in step 1.3 the masking film is formed by causing a solvent to evaporate from the masking medium or by activating the masking medium by means of heating or by means of irradiation.

7. The method according to claim 1, wherein in step 1.5 the masking film is removed by mechanical removal.

8. The method according to claim 1, wherein the film-forming masking medium comprises a prinking ink.

* * * * *